United States Patent [19]

Beinhaur et al.

[11] Patent Number: 4,987,283
[45] Date of Patent: Jan. 22, 1991

[54] METHODS OF TERMINATING AND SEALING ELECTRICAL CONDUCTOR MEANS

[75] Inventors: Ernest L. Beinhaur, Harrisburg; Homer E. Henschen, Carlisle; Michael J. McKee, New Cumberland; Joseph M. Pawlikowski, Lancaster, all of Pa.

[73] Assignee: AMP Incorporated, Harrisburg, Pa.
[21] Appl. No.: 287,766
[22] Filed: Dec. 21, 1988
[51] Int. Cl.[5] .......................... H05B 6/10; B23K 1/00
[52] U.S. Cl. ............................. 219/85.11; 219/10.43; 219/9.5; 219/10.75; 29/857; 228/180.1
[58] Field of Search .................... 219/10.41, 10.43, 9.5, 219/85.1, 85.11, 85.22, 85.18, 10.75; 29/860, 447, 857; 228/179, 180.1, 180.2; 174/84 R, 88 R

[56] References Cited

U.S. PATENT DOCUMENTS

| | | |
|---|---|---|
| 2,759,161 | 8/1956 | Berg . |
| 2,926,231 | 2/1960 | McDowell ................ 219/85.11 |
| 3,360,631 | 12/1967 | Hess ......................... 29/447 X |
| 3,396,460 | 8/1968 | Wetmore ................. 264/230 X |
| 3,491,426 | 1/1970 | Grassauer ..................... 29/203 |
| 3,525,799 | 8/1970 | Ellis et al. ..................... 174/84 |
| 3,601,783 | 8/1971 | Loose ........................ 339/223 R |
| 3,708,611 | 2/1972 | Dinger ........................ 174/84 C |
| 3,721,749 | 3/1973 | Clabburn ................... 174/88 R |
| 3,930,606 | 1/1976 | Dewdney ..................... 228/232 |
| 3,945,114 | 3/1976 | Siden et al. .................... 29/628 |
| 4,251,305 | 2/1981 | Becker et al. ................... 156/86 |
| 4,256,945 | 3/1981 | Carter et al. ................ 219/10.75 |
| 4,292,099 | 9/1981 | Dinger ........................ 174/84 R |
| 4,341,921 | 7/1982 | Simpson ..................... 174/84 R |
| 4,431,891 | 2/1984 | Forstner et al. ................. 219/9.5 |
| 4,436,565 | 3/1984 | Weitzel et al ............. 174/88 C X |
| 4,460,820 | 7/1984 | Matsumoto et al. .......... 264/230 X |
| 4,464,540 | 8/1984 | Reeder ..................... 174/DIG. 8 X |
| 4,504,699 | 3/1985 | Dones et al. ............. 174/DIG. 8 X |
| 4,595,724 | 6/1986 | Koblitz ...................... 174/84 R |
| 4,623,401 | 11/1986 | Derbyshire et al. ............... 148/13 |
| 4,626,767 | 12/1986 | Clappier et al. ................. 323/280 |
| 4,659,912 | 4/1987 | Derbyshire ..................... 219/535 |
| 4,687,893 | 8/1987 | Rasmussen et al. ............. 219/10.41 |
| 4,695,712 | 9/1987 | Busch ........................... 219/535 |
| 4,695,713 | 9/1987 | Krumme ..................... 219/10.79 |
| 4,696,841 | 9/1987 | Vidakovits ............. 174/DIG. 8 X |
| 4,701,587 | 10/1987 | Carter et al. ................ 219/10.75 |
| 4,717,814 | 1/1988 | Krumme ...................... 219/10.77 |
| 4,722,471 | 2/1988 | Gray et al. ............. 174/DIG. 8 X |
| 4,745,264 | 5/1988 | Carter ......................... 219/10.79 |
| 4,752,673 | 6/1988 | Krumme ...................... 219/10.41 |
| 4,789,767 | 12/1988 | Doljack ......................... 219/9.5 |
| 4,795,870 | 1/1989 | Krumme et al. ................ 219/9.5 |
| 4,821,944 | 4/1989 | Tsumura ........................ 219/9.5 |
| 4,852,252 | 8/1989 | Ayer ............................ 29/860 |

FOREIGN PATENT DOCUMENTS 0241597 10/1987 European Pat. Off. .
WO84/2098 6/1984 World Int. Prop. O. .

OTHER PUBLICATIONS

European Search Report No. RS 84683 US dated Oct, 1989.

*Primary Examiner*—Philip H. Leung
*Attorney, Agent, or Firm*—Anton P. Ness

[57] ABSTRACT

A strap comprised of a layer of magnetic material on a layer of nonmagnetic conductive metal comprises a self-regulating heater, which is wrapped around a length of heat recoverable tubing disposed around a terminal being terminated to a conductor wire, or a pair of wires being spliced. When energized, the strap generates thermal energy melting solder of a preform within the tubing, terminating the terminal to the wire, or the two wires together, and sealing the termination simultaneously. A plurality of terminals in a connector housing include solder tails extending rearwardly from the housing so that respective wire ends may be placed therealong within solder preforms within heat recoverable tubing thereabout. A strap comprising a self-regulating temperature source is wrapped around the array of solder tails and wire ends and is energized to solder the array and seal the terminations. A high frequency alternating current induced in or transmitted to the magnetic layer of the strap causes the strap to generate thermal energy sufficient to melt the solder and shrink the tubing. The strap may have several layers and may be shapable to conform to the outer surfaces of the heat recoverable tubing lengths. A strap may seal an open end of a length of heat recoverable tubing having a sealant preform therewithin, when wrapped therearound and energized.

26 Claims, 12 Drawing Sheets

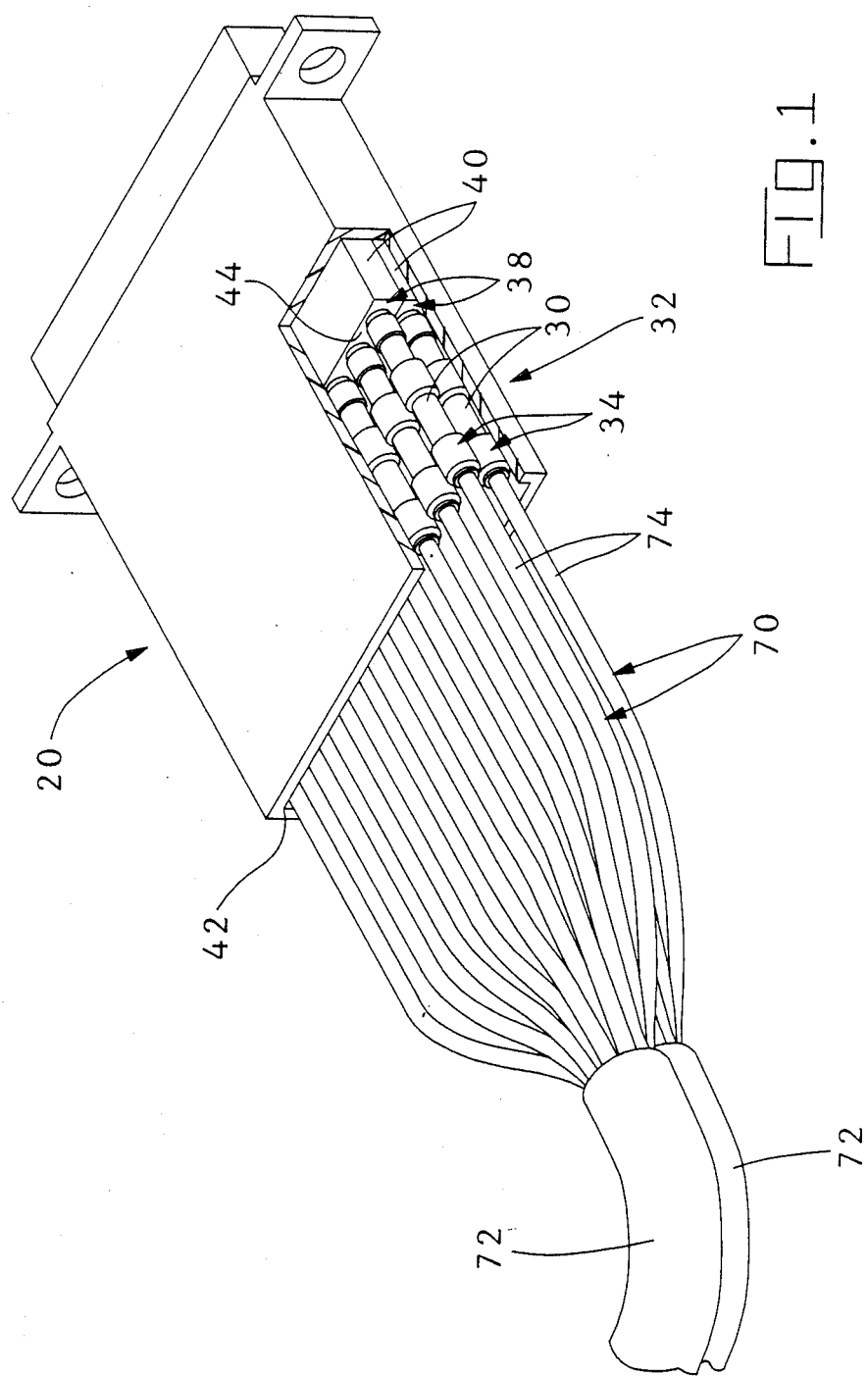

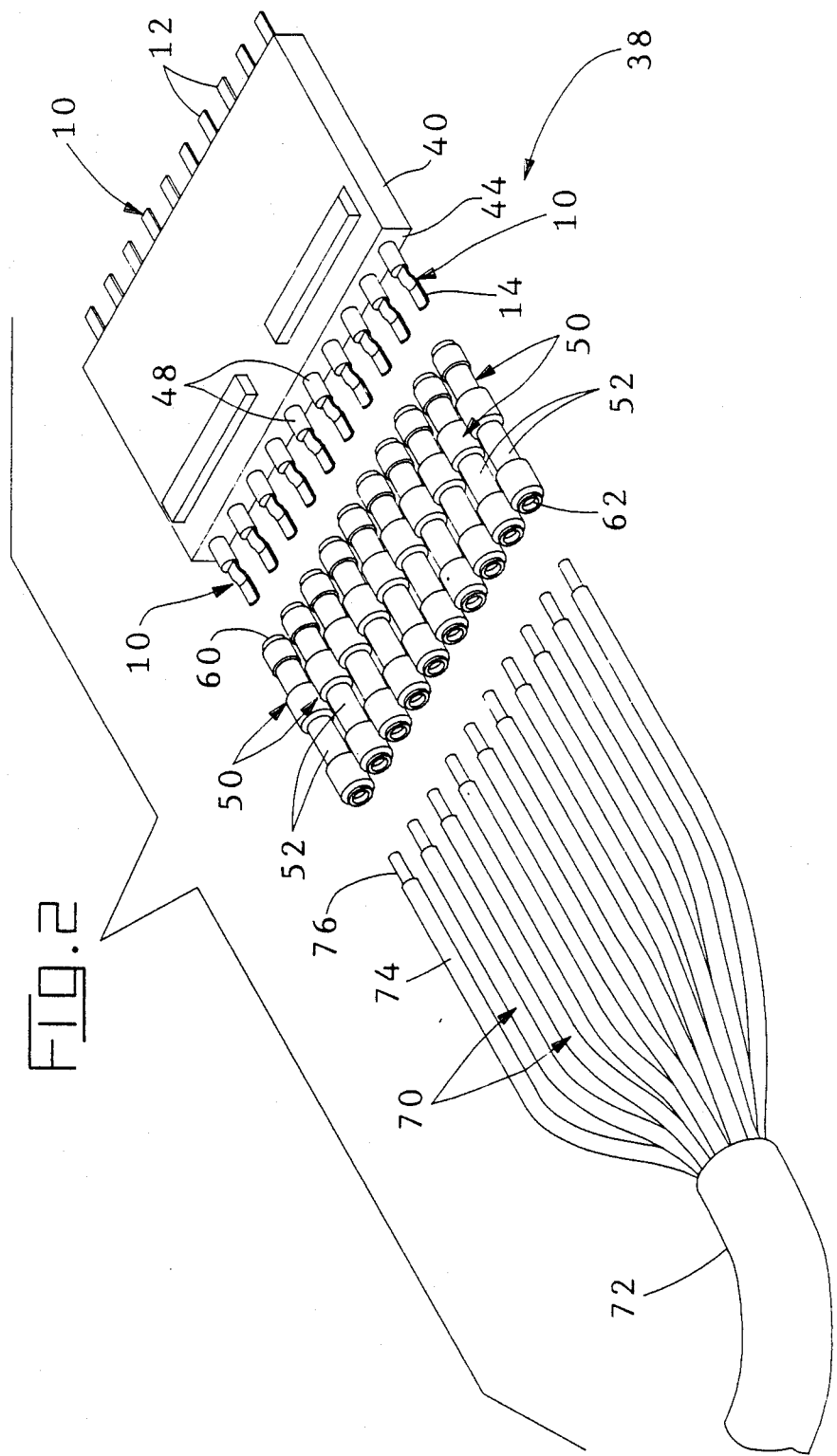

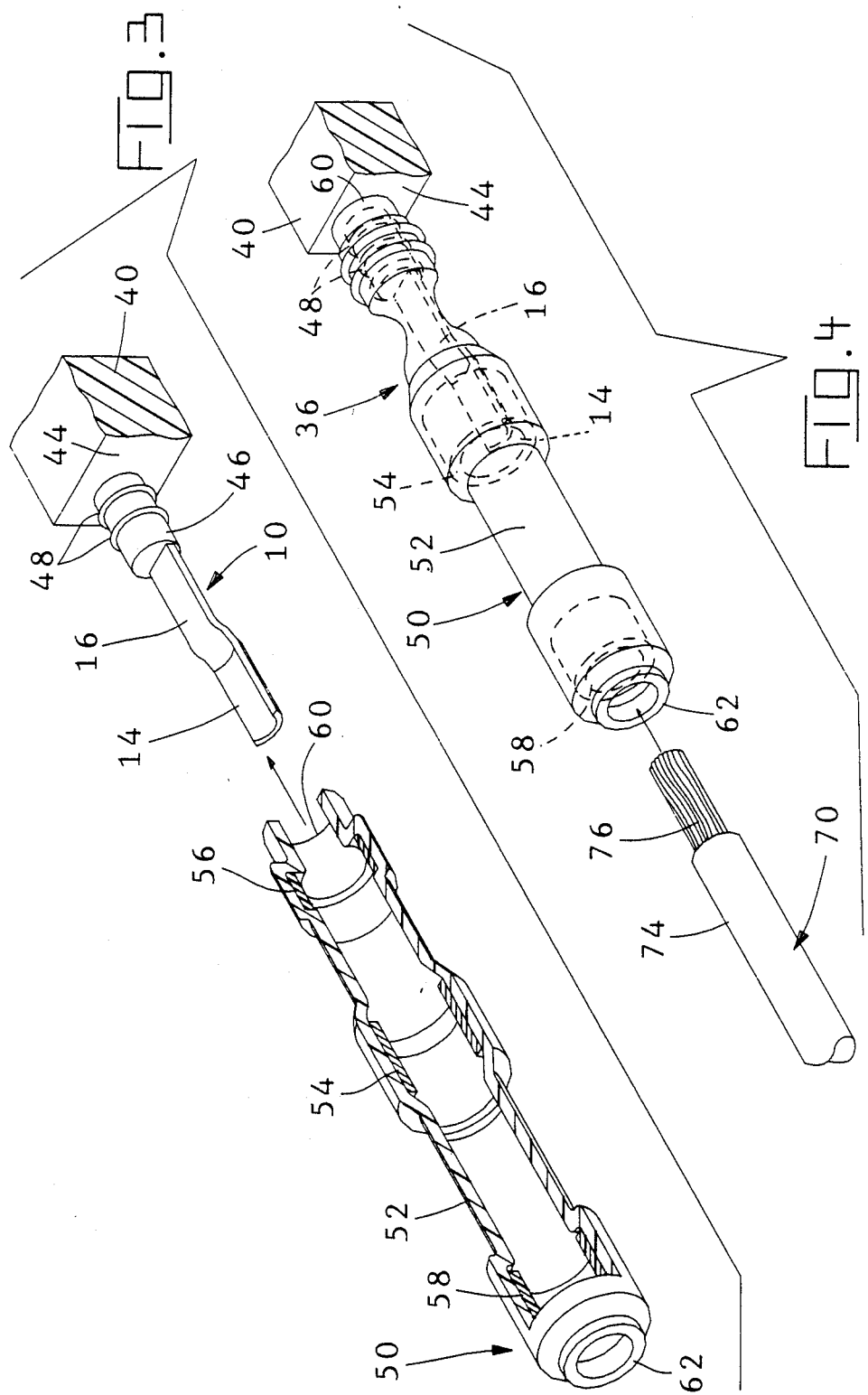

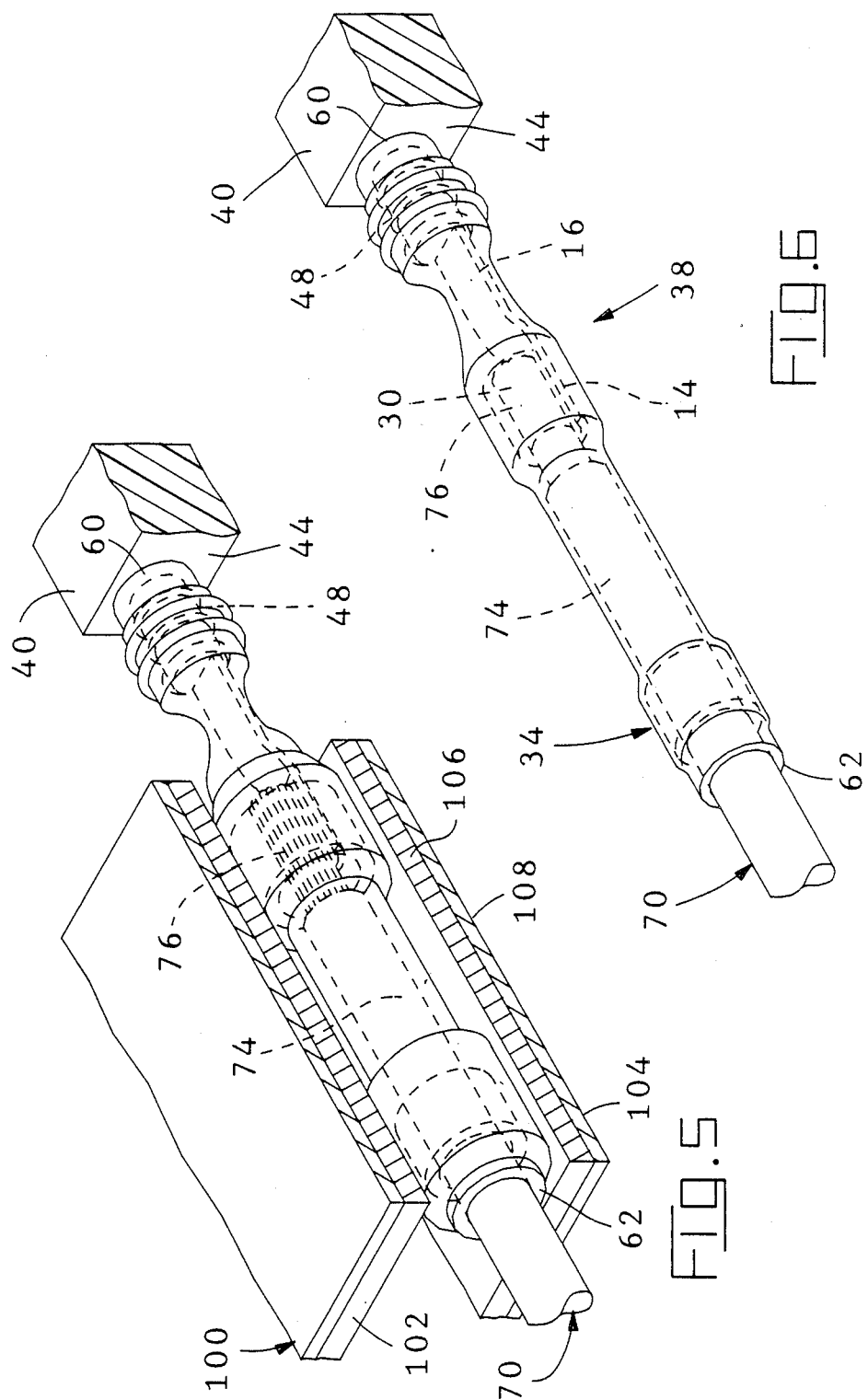

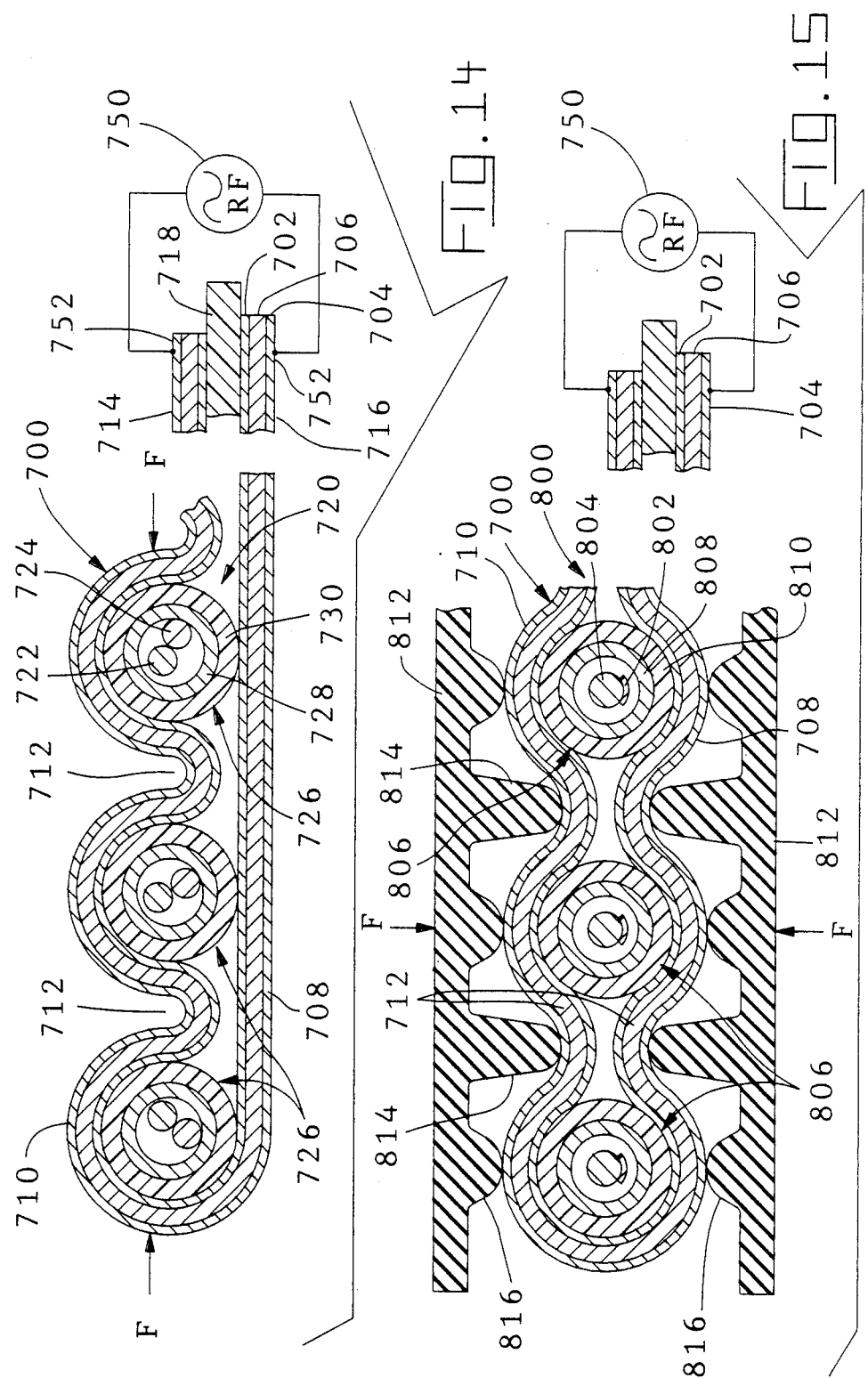

METHODS OF TERMINATING AND SEALING ELECTRICAL CONDUCTOR MEANS

FIELD OF THE INVENTION

The present invention relates to the field of electrical connectors and more particularly to multiterminal connectors for terminating a plurality of conductor wires.

BACKGROUND OF THE INVENTION

Electrical connectors are known which have a plurality of terminals disposed in a dielectric housing and which are to be terminated to a respective plurality of conductor wires. In one such connector the terminals are disposed in a single row within a housing molded thereover and extend rearwardly from the housing, to conclude in termination sections comprising shallow channels termed solder tails. The housing may include cylindrical portions extending rearwardly to surround the terminals forwardly of the solder tails. When the conductor wires are prepared to be terminated to the solder tails, individual sleeve-like solder preforms encased within respective longer sleeves of heat recoverable or heat shrink tubing are placed over the rearwardly extending terminal portions so that the solder preforms surround the solder tails, or a strip of such units appropriately spaced apart; the stripped wire ends are then inserted into the heat recoverable tubing sleeves and into the solder preforms surrounding the solder tails; the entire assembly is then placed in a conventional thermal energy source and heated by convection, with the heat energy penetrating through the heat recoverable tubing to melt the solder which then flows around the stripped wire ends within the solder tails and upon cooling forms respective solder joints joining the conductor wires to the terminals; and simultaneously the heat recoverable tubing is heated above a threshold temperature at which the tubing shrinks in diameter until it lies adjacent and tightly against surfaces of the solder tails and the wire termination therewithin, a portion of the insulated conductor wire extending rearwardly therefrom, and a portion of the terminal extending forwardly therefrom to the rearward housing surface, sealing the exposed metal surfaces. Apparatus for wire and sleeve handling with respect to such a connector is known such as from U.S. Pat. No. 3,945,114. Within forward and rearward ends of the tubing are located short sleeve-like preforms of fusible sealant material which will shrink and also tackify upon heating to bond and seal either to the insulation of the wire or to the cylindrical housing portions, whichever is therewithin, and to bond to the surrounding heat recoverable tubing. Examples of such assemblies of heat recoverable tubing lengths with solder preforms and sealant preforms therein are disclosed in U.S. Pat. Nos. 3,525,799; 4,341,921 and 4,595,724.

Conventional thermal energy sources achieve a temperature in excess of a control temperature, which is chosen to be somewhat above the ideal temperature at which a particular solder material melts in order to compensate for less than ideal thermal energy transfer. Several disadvantages attend such a thermal energy delivery method: portions of the connector other than connection sites are subjected to substantial heat which may be detrimental to the connector material; the thermal energy applied to connector portions other than the connection sites is wasted; components possible may be damaged because of general overheating, and some sites may achieve a temperature much higher than necessary in order to assure that other sites achieve a sufficient solder melting temperature; the thermal energy source either requires a long warm-up period which is wasteful of time, or remains heated at its steady state temperature which is wasteful of energy; and maintenance of a continuous and accurate control over temperature and time is an ideal desire requiring a diligence and responsive apparatus not consistently met or found in practice. Another disadvantage is that heat recoverable tubing which is initially made transparent and is desired to remain transparent to allow visual inspection of the solder joint after termination, commonly receives enough excess thermal energy to opaquify, at least obscuring the solder joint therewithin.

It is desired to obtain solder joints without heating all portions of the connector.

It is desired to consistently obtain assured solder joints in a multiterminal connector having prehoused terminals.

It is known in the prior art to utilize a self-regulating temperature source which when energized by a constant amplitude, high frequency alternating current passing therethrough, generates thermal energy and achieves a resulting constant temperature. Such a temperature can be selected to be just higher than the ideal temperature at which solder melts. The self-regulating temperature source is disclosed in U.S. Pat. Nos. 4,256,945; 4,623,401; 4,659,912; 4,695,713; 4,701,587; 4,717,814; 4,745,264 and European Pat. Publication No. 0241,597, which are expressly incorporated herein by reference. The self-regulating temperature source employs a substrate of copper or copper alloy or other conductive material of low electrical resistivity, negligible magnetic permeability and high thermal conductivity; deposited on one surface thereof is a thin layer of thermally conductive magnetic material such as iron, nickel or a nickel-iron alloy having a much higher electrical resistance and magnetic permeability than the substrate material.

When a radio frequency current for example is passed through such a two-layer structure, the current initially is concentrated in the thin high resistance magnetic material layer which causes heating; when the temperature in the magnetic material layer reaches its Curie temperature, it is known that the magnetic permeability of the layer decreases dramatically; the current density profile then expands into the non-magnetic substrate of low resistivity. The thermal energy is then transmitted by conduction to adjacent structure such as wires and solder which act as thermal sinks; since the temperature at thermal sink locations does not rise to the magnetic material's Curie temperature as quickly as at non-sink locations, the current remains concentrated in those portions of the magnetic material layer adjacent the thermal sink locations and is distributed in the low resistance substrate at non-sink locations. It is known that for a given frequency the self-regulating temperature source achieves and maintains a certain maximum temperature dependent on the particular magnetic material.

The conductive substrate can be copper having a magnetic permeability of about one and a resistivity of about 1.72 micro-ohms per centimeter. The magnetic material may be for example a clad coating of nickel-iron alloy such as Alloy No. 42 (forty-two percent nickel, fifty-eight percent iron) or Alloy No. 42-6 (forty-two percent nickel, fifty-two percent iron, six percent chromium). Typical magnetic permeabilities for the magnetic layer range from fifty to about one thousand, and electrical resistivities normally range from twenty to ninety micro-ohms per centimeter as compared to 1.72, for copper; the magnetic material layer can have a Curie temperature selected to be from the range of between 200° C. to 500° C. The thickness of the magnetic material layer is typically one skin depth; the skin depth is proportional to the square root of the resistivity of the magnetic material, and is inversely proportional to the square root of the product of the magnetic permeability of the magnetic material and the frequency of the alternating current passing through the two-layer structure.

SUMMARY OF THE INVENTION

The present invention employs self-regulating temperature source technology to terminate a conductor wire to a termination section of a terminal, to splice a pair of conductor wires or to terminate a plurality of conductor wires to respective terminals of an electrical connector. A stripped wire end is placed along a solder tail of a terminal; a sleeve-like solder preform containing flux is placed around the wire end and solder tail; a length of heat recoverable tubing is placed around the solder preform and extends axially to opposed tubing ends around the insulated wire portion and an insulated terminal portion; sealant preforms are placed within the opposed tubing ends and around the insulated wire portion and insulated terminal portion; a heater means having a first layer of conductive nonmagnetic metal and a second layer of high resistance magnetic material is placed around the heat recoverable tubing length; a high frequency alternating current is induced in or transmitted to the heater means which then generates thermal energy; and the thermal energy is transmitted to the tubing and the solder and sealant preforms, melting the solder to terminate the wire to the terminal and melting and tackifying the sealant preforms to bond to the insulated wire and terminal portions and shrinking the tubing, thus forming a termination and sealing it simultaneously.

In one arrangement utilizing the method of the present invention, a terminal subassembly is formed by placing a plurality of terminals in a dielectric housing, such as by molding dielectric material around body sections of the terminals, and contact sections of the terminals are exposed along a mating face of the housing for eventual mating with corresponding contact sections of another connector. Termination sections of the terminals extend rearwardly from the housing to be terminated to individual conductor wires, and comprise preferably shallow channels. The terminals may be made of a copper alloy such as brass, phosphor bronze or beryllium copper for example.

Sleeve-like preforms of solder with flux are placed around the termination sections, with lengths of heat recoverable tubing around the solder preforms and extending forwardly over cylindrical housing flanges covering the terminals forwardly of the terminating sections, to the rear surface of the housing, and rearwardly a distance beyond the ends of the termination sections. Stripped ends of conductor wires are placed along the respective channels and within the solder preforms, and a portion of the insulated wire extends into the rearward end of the heat recoverable tubing lengths. Sleeve-like preforms of sealant material may be disposed within the forward and rearward tubing sections to melt and shrink, tackify and bond to the housing flanges and wire insulation respectively, and bond to the surrounding portions of heat recoverable tubing.

A heater means is then placed in position across the termination region above and below the termination sections. The heater means may be a strap wrapped around the plurality of termination sections having the heat recoverable tubing sleeves thereover containing the solder preforms. The metal strap comprises a self-regulating temperature source and includes two layers of different metals: a first layer of electrically conductive, low resistivity, low magnetic permeability metal such as copper or copper alloy; and a second layer of metal having high resistivity and high magnetic permeability such as iron, nickel or nickel-iron alloy.

A selected constant amplitude high frequency alternating current is generated by an appropriate apparatus which is transmitted to or induced in the strap. The current in the strap over a short length of time produces thermal energy which rises to a certain temperature selected to be slightly higher than needed to melt the solder preforms. The thermal energy is transmitted to the solder preforms within the lengths of heat recoverable tubing around the respective termination sections thereby melting the solder which forms solder joints between the wires and the termination sections. The thermal energy also is transmitted to and begins to melt and shrink and tackify the sealant preforms and to shrink the surrounding heat recoverable tubing which reduces to conform to the outer surfaces of the structure therewithin including the insulated wire portion, the termination sections including the terminations, the shrunken sealant preforms and the housing flanges. The terminations of the terminals to the wires are completed and the terminations and all exposed metal is sealed and the strap preferably removed, completing the connector.

The current may be transmitted to the strap by ohmic connections to two isolated ends of the strap by electrodes of the apparatus. The current also may be induced in the strap by an appropriate apparatus having a coil surrounding the strap which is disposed around the termination region transverse to the assembly, and the coil then being energized. Using induction for generating the current, the heater means may be a pair of plate members surrounded by the coil instead of being a continuous strap.

It is an objective to provide a method for joining a pair of conductive means to each other and simultaneously sealing the joint thus formed.

It is an objective to provide a connector having a plurality of discrete terminals to be terminated to conductor wires and then sealed in a simple, assured, efficient and economical process.

It is another objective to solder the wires and seal the terminations simultaneously.

It is a further objective to solder the wires to the terminals by assuredly achieving a certain selected temperature at all termination sites.

It is yet another objective to provide the necessary elevated temperature within only the region containing the termination sites.

It is still another objective to provide a self-regulating temperature source which minimizes the amount of excess heat received by the tubing, enhancing its ability to remain transparent, and thereby allow visual inspection of the solder joint.

It is also an objective to provide a method for sealing an end of a length of heat recoverable tubing using a self-regulating temperature source.

An example of the present invention will now be described with reference to the accompanying drawings.

BRIEF DESCRIPTION OF THE DRAWINGS

FIG. 1 is a perspective view of a connector with which the present invention is used;

FIG. 2 is similar to FIG. 1 with a terminal subassembly of the connector exploded from the conductor wires, showing lengths of heat recoverable tubing containing solder preforms used in the assembly of the connector;

FIG. 3 is an enlarged perspective, part section view of a sleeve assembly to be placed over a solder tail;

FIGS. 4 to 6 are enlarged perspective views of the single termination site of FIG. 3 showing a termination section, sleeve assembly and wire end prior to termination, in place to be terminated by a heater strap, and terminated and sealed respectively;

FIGS. 14 and 15 show additional methods of using a shapable heater strap with a splice termination array as in FIG. 13 and a plurality of terminals for conductor wires as in FIG. 7 respectively;

DETAILED DESCRIPTION OF THE PREFERRED EMBODIMENTS

Figure 7:
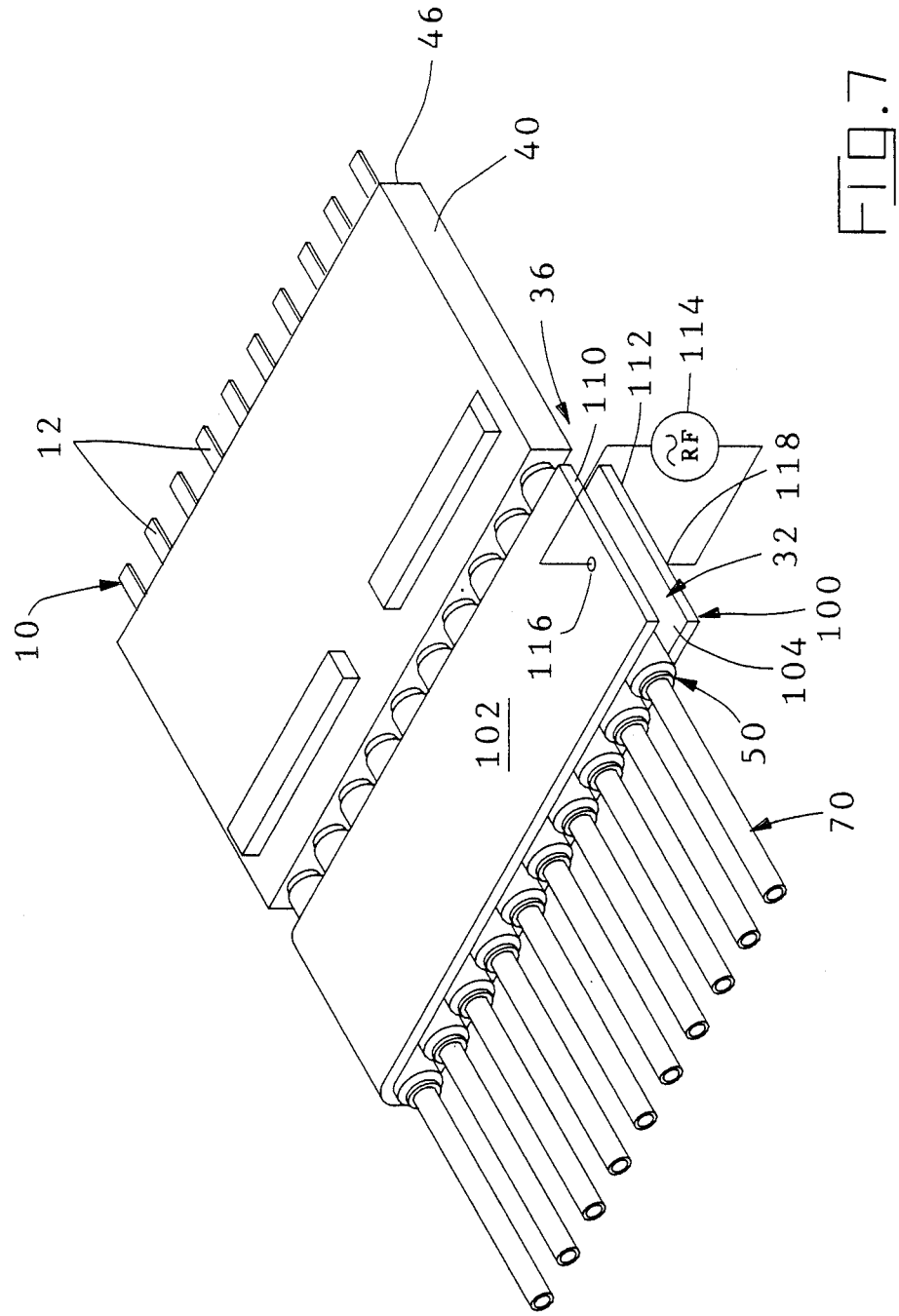
FIGS. 7 and 8 are perspective views showing the terminal subassembly and wires and lengths of heat recoverable tubing having a heater strap placed therearound, with a high frequency alternating current being transmitted to and induced in the heater strap, respectively.

FIG. 1 shows a connector 20 having a plurality of terminals 10 (FIG. 2) secured within a pair of dielectric housings 40 within a shell 42. Terminals 10 are terminated at terminations 30 to a respective plurality of conductor wires 70 within a termination region 32 rearwardly of wire face 44 of housings 40. Respective blade contact sections 12 (FIG. 2) of terminals 10 extend forwardly from a mating face of housings 40 to be mated eventually with corresponding contact sections of terminals of a mating connector (not shown). Conductor wires 70 have insulation material therearound and may be bundled within an outer jacket 72. The termination region 32 includes individual seals 34 formed around terminations 30 and extending from wire face 44 of each housing 40 to insulated end portions 74 of wires 70. The terminals 10 are shown disposed in single rows for a low profile module 38 for a miniature rectangular connector, although the present invention may be used with other styles of connectors and other terminal arrangements. Terminals may also be socket or receptacle-type terminals.

Referring to FIGS. 2 and 3, each terminal 10 includes a terminating section 14 disposed at the end of an intermediate section 16 extending rearwardly from a body section secured within housing 40. Preferably much of intermediate section 16 is embedded within a cylindrical housing portion or flange 46 extending rearwardly from wire face 44 to facilitate eventual process steps and to assure appropriate sealing. Flange 46 may include annular ribs 48 or other projections to assist eventual sealing. Terminating section 14 may have a shallow channel shape and is conventionally termed a solder tail for eventual placement of a stripped end portion 76 of a conductor wire 70. Sleeve assembly 50 associated with solder tail 14 comprises a length of heat recoverable tubing 52, which includes therewithin a solder preform 54 and preferably includes two sealant preforms 56,58 also therewithin.

Solder preform 54 preferably is formed in a sleeve shape of short length large enough to be placed over and around a respective solder tail 14 and also then to receive a stripped conductor wire end thereinto. Length 52 of preferably transparent heat recoverable tubing is formed to be placed over solder preform 54 and be sufficiently long to extend over flange 46 from wire face 44, over solder tail 14, and over insulated wire end portion 76. Solder preform 54 is placed within tubing 52 at an axial location appropriate so that when the sleeve assemblies 50 are placed over the rearwardly extending terminal portions the solder preform 54 will surround the solder tail 14. Sealant preforms 56,58 are short sleeves axially spaced to be disposed over flange 46 and the insulated wire end portion 74 respectively. The plurality of sleeve assemblies 50 for the plurality of solder tails 14 may be joined if desired by a strip of adhesive tape or the like to form a single entity for convenient handling as is conventionally known, with sleeve assemblies 50 appropriately spaced apart to correspond to the spacing of the terminals 10 secured in housing 40.

Solder preform 54 and sealant preforms 56,58 are secured within tubing 52 such as by being force-fit therewithin, or by tubing 52 being partially shrunk or reduced in diameter therearound. Solder preform 54 may be made of tin-lead solder including solder flux mixed therein or coated therearound, such as for example Sn 63 meltable at a temperature of about 183° C. or Sb-5 meltable at about 240° C.; sealant preforms 56,58 may comprise for example a homogeneous mixture of polyvinylidene fluoride, methacrylate polymer and antimony oxide, which will shrink in diameter at a nominal temperature selected to be about 190° C.; and tubing 52 is preferably transparent and may be of crosslinked polyvinylidene fluoride and have a nominal shrinking temperature of about 175° C. Generally it would be preferable to provide a thermal energy source capable of achieving a temperature of about 50° C. to 75° C. above the solder melting point.

In FIG. 4 leading end 60 of sleeve assembly 50 has been placed over a respective solder tail 14 and moved forwardly until leading end 60 abuts wire face 44 of housing 40, so that sealant preform 56 surrounds flange 46 and solder preform 54 surrounds solder tail 14. Optionally in a preliminary assembly step a limited amount of heat may then be applied locally to leading end 60 thereby reducing sealant preform 56 to bond to flange 46 and grip annular ribs 48 which resist axially rearward pulling on the sleeve assembly 50; tubing 52 also reduces in diameter around flange 46 and sealant preform 56. Such a preliminary assembly step allows housing 40 and the plurality of sleeve assemblies 50 to be handled as a unit, housing/sleeve assembly 36. Stripped conductor wire 76 is inserted into trailing end 62 of sleeve assembly 50 until located such as by visual observation through transparent tubing 52 completely along solder tail 14 within solder preform 54, and insulated end portion 74 is disposed within sealant preform 58. A self-regulating heater means is then placed in position at the termination region 32. Upper and lower strap portions 102,104 are seen of a strap 100 which has been placed around the solder tail 14 within the solder preform 54 and tubing length 52.

FIG. 6 shows a terminated and sealed connection after the solder has been melted according to the present invention with thermal energy generated by strap 100 to form a solder joint termination 30 between wire end 76 and solder tail 14, sealant preform 58 has been shrunk in diameter to bond to insulated wire end 74, and tubing 52 has shrunk to conform to the outer surfaces of the structures therewithin, and bonds to sealant preform 58 thereby sealing the termination by tightly gripping about the insulated wire end 74 at trailing end 62 and the flange 46 at leading end 60, forming a seal 34 extending between insulated conductor 70 and housing 40.

Figure 8:
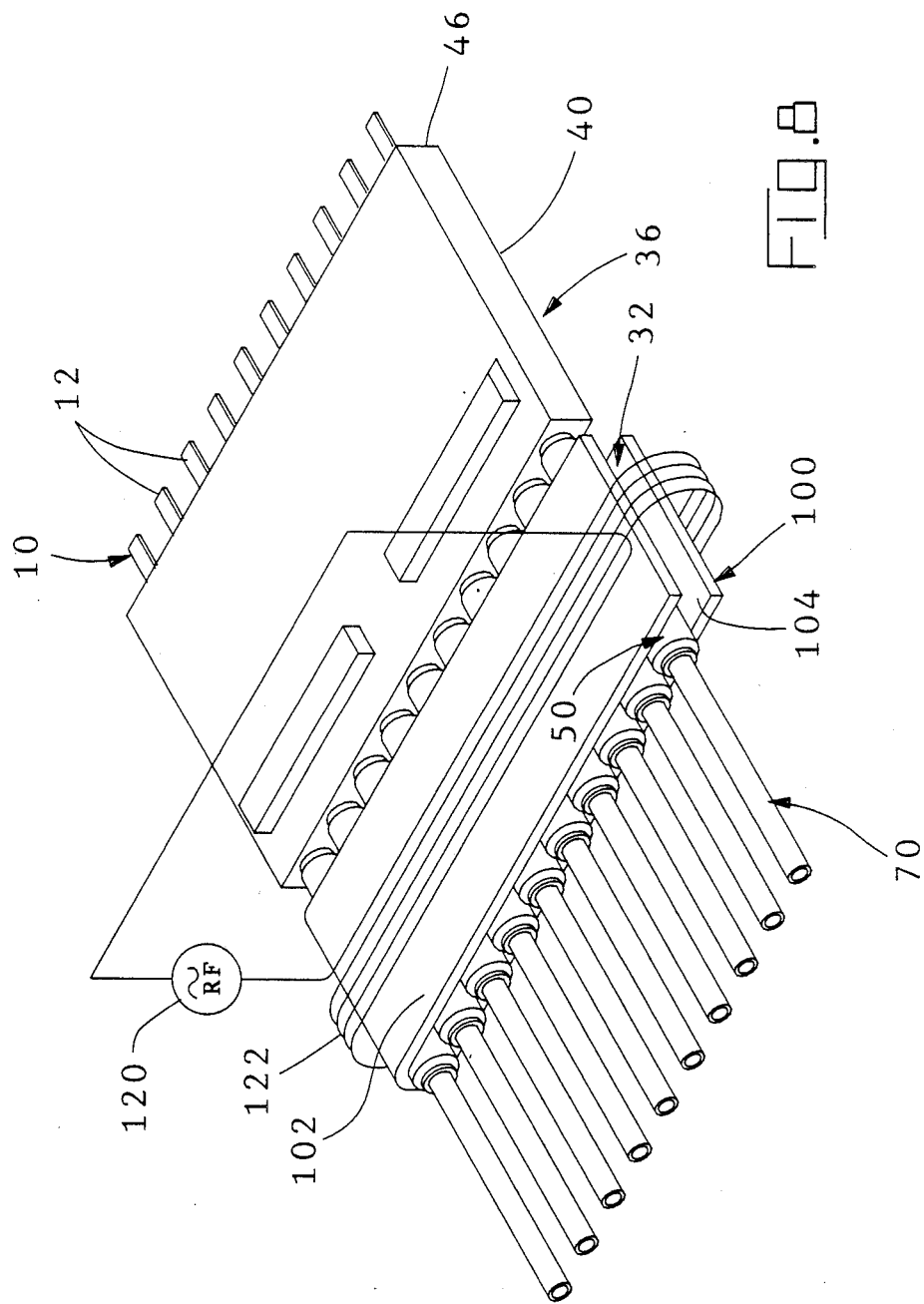

FIGS. 7 and 8 illustrate terminating the wires and solder tails and sealing the terminations. A strap 100 placed around the array of solder tails 14 within the termination region 32 with a top section 102 overlying the terminating region and a bottom section 104 thereunder. A constant amplitude high frequency alternating current is generated by apparatus 114 such as a radio frequency signal at a frequency of 13.56 MHz such as by an apparatus disclosed in U.S. Pat. No. 4,626,767. After a length of time such as about 30 seconds, the strap 100 has achieved a certain temperature determined by the particular magnetic material, which penetrates the tubing lengths and melts the solder preforms, and then shrinks the tubing lengths resulting in the sealed terminations of FIG. 6.

Strap 100 of FIGS. 5 to 7 comprises a first layer 106 comprising a substrate of copper or copper alloy such as brass or phosphor bronze having a thickness of for example 0.002 inches. One major surface of the substrate has deposited thereon a thin layer 108 of magnetic material such as a nickel-iron alloy like Alloy No. 42 having a thickness of for example between 0.0004 and 0.0006 inches. Typically a roll cladding process may be used where an amount of the magnetic material is laid over the substrate, then subjected to high pressure and temperature which diffuses the two materials together at the boundary layer, but other processes such as plating or sputter depositing could be used. A thin layer of dielectric coating material may be applied over the magnetic material to inhibit oxidation. Optionally a strap could be formed by plating a layer of nickel onto a layer of copper to a thickness preferably 1½ to 2 times the skin depth of nickel at the selected current frequency.

In FIG. 7 a high frequency alternating current is being transmitted by apparatus 114 to isolated ends 110,112 of heater strap 100 such as by electrodes forming a pair of ohmic connections 116,118 with the strap.

In FIG. 8 a high frequency alternating current is being induced by apparatus 120 in heater strap 100 by a coil 122 thereof surrounding heater strap 100 and termination region 32.

It is preferred that the inwardly facing surfaces of the heater strap be in engagement with the sleeve assemblies therewithin to transmit thermal energy to the sleeves and to the solder preforms therewithin, and the surfaces of the heater strap may also be spring loaded against the sleeve assemblies preferably by means (not shown) having good thermal insulating properties to avoid acting as thermal sinks and removing thermal energy desired for the termination region.

An example of a process using the self-regulating temperature source strap of the present invention would be: providing an apparatus capable of providing a constant amplitude high frequency alternating current having frequency such as 13.56 MHz; selecting a solder preform having tin-lead solder with flux which melts at a nominal temperature of about 183° C.; selecting heat recoverable tubing shrinkable at a nominal temperature of 175° C. and disposed around the solder preform; securing around the termination region a strap having a layer of brass with a thickness of 0.0020 inches and having thereunder a thin clad layer of Alloy No. 42 having a thickness of between 0.0004 to 0.0006 inches and applying an RF current at 13.56 MHz thereto for about 30 to 60 seconds. The self-regulating temperature source which comprises the strap will rise to a temperature of generally about 350° C., melt the solder, shrink the sealant preforms, and shrink the tubing. Also, if solder preforms are selected having a melting temperature of about 240° C. such as Sb-5, a magnetic material may be used having a nominal Curie temperature of about 300° C. to 315° C.

Figure 9:
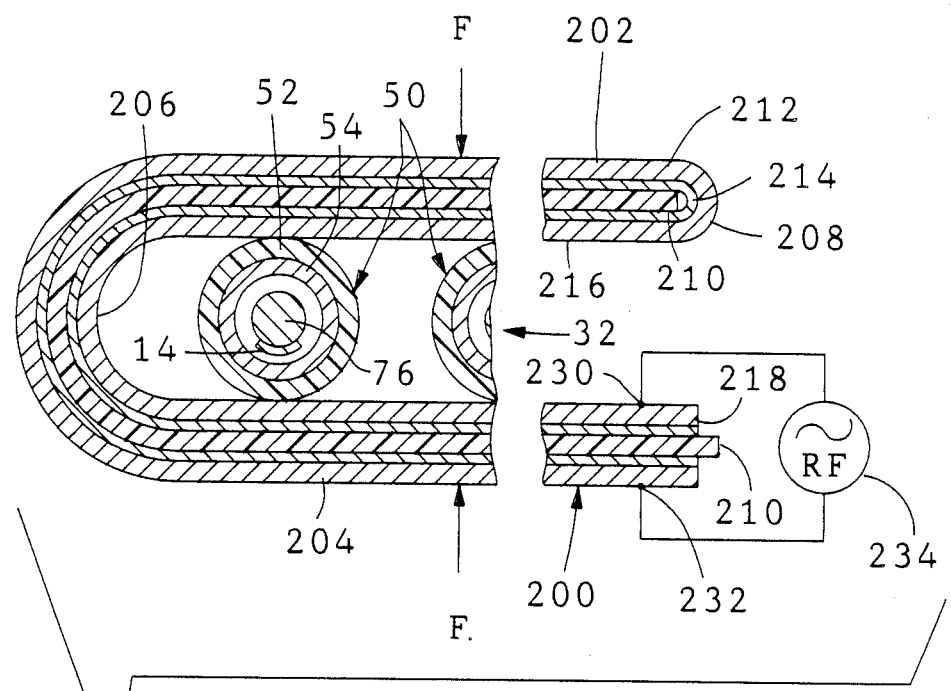
FIGS. 9 and 10 are cross-section views of two embodiments of the heater strap of the present invention.
Figure 10:
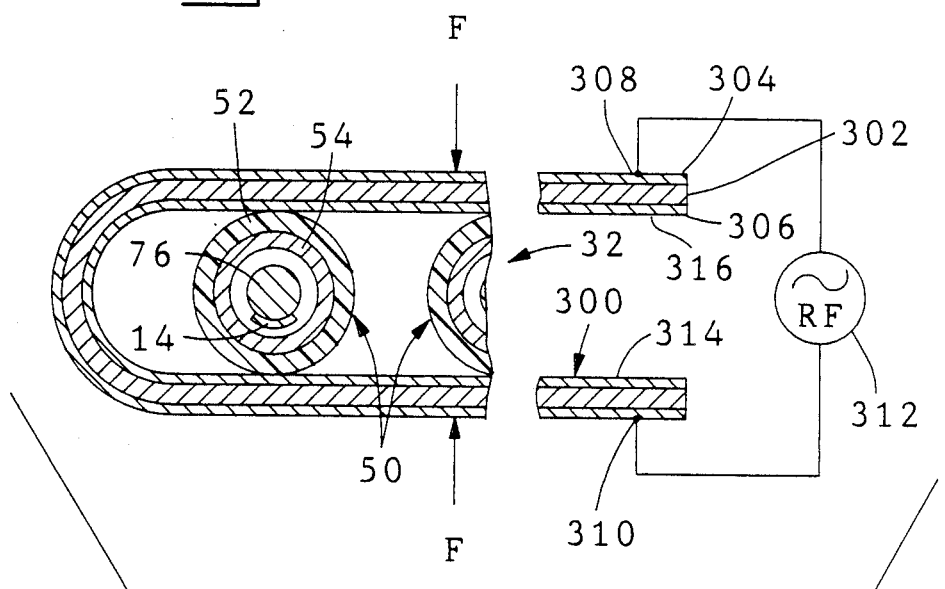

FIGS. 9 and 10 show different embodiments of heater straps. In FIG. 9 strap 200 includes upper portion 202 and lower portion 204 joined at bight 206 together surrounding termination region 32 in which are disposed the sleeve assemblies 50 including heat recoverable tubing 52 surrounding respective termination sections 14 of the terminals and wire ends 76 within solder preforms 54. Strap 200 can be an elongate member which is doubled over upon itself at bend 208 with a layer 210 of plastic such as KAPTON secured between the doubled over portions. The elongate member prior to doubling over includes an outermost layer 212 of conductive nonmagnetic material such as copper to which is clad a layer 214 of magnetic material, and upon doubling over the magnetic layer 214 is adjacent the plastic layer both above and below while the now-inwardly facing surface portion 216 of copper layer 212 is adjacent the sleeve assemblies 50. The ohmic connections 230,232 are made by electrodes of apparatus 234 at strap end 218 to the inwardly facing surface portion 216 and outwardly facing surface portion 220 of copper layer 212 which are insulated by plastic layer 210 at end 218, and a high frequency alternating current is transmitted to strap 200 whereby thermal energy is generated.

In FIG. 10 strap 300 has a simpler construction surrounding termination region 32. A central layer 302 of conductive nonmagnetic metal such as copper has outer layers 304,306 of magnetic material such as nickel-iron alloy clad thereto. Ohmic connections 308,310 are made by electrodes of apparatus 312 at ends 314,316 respectively to transmit a current to strap 300 whereby thermal energy is produced.

Figure 11:
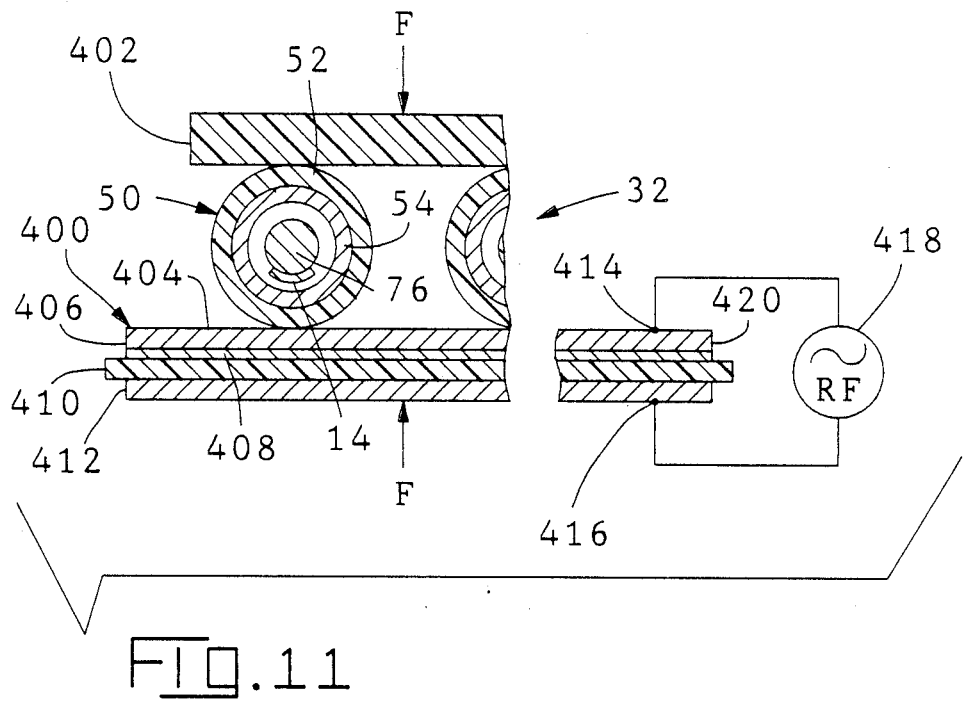
FIGS. 11 and 12 show an alternate heater means comprising one plate member using an ohmic connection, or a pair of plate members in which current is induced by a surrounding coil, respectively.
Figure 12:
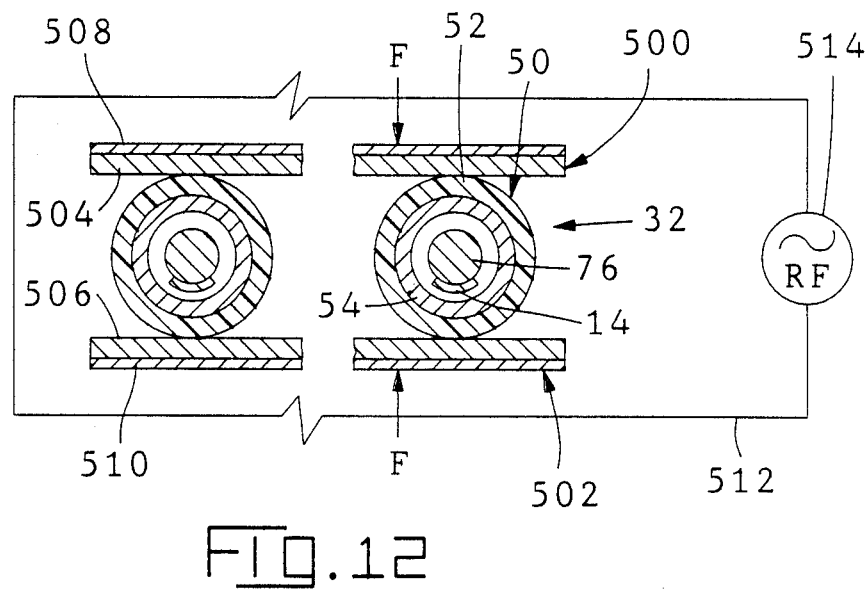

As shown in FIGS. 11 and 12, the heater means need not be a continuous loop in order for a current to exist therein. In FIG. 11 a single heater plate 400 is shown below termination region 32, while a plate 402 of low thermal conductive material preferably urges sleeve assemblies 50 against the upper surface 404 of upper layer 406 of heater plate 400. Upper layer 406 may be conductive nonmagnetic material such as copper; an inner layer 408 of magnetic material such as Alloy No. 42 is clad thereto; an insulative layer 410 such as KAPTON plastic is disposed against magnetic layer 408; and plate 400 includes a lower layer 412 of conductive nonmagnetic material such as copper. Insulative layer 410 provides that the pair of ohmic connections 414,416 may be made by electrodes of apparatus 418 at one end 420 of the plate 400 and a current generated along the entire length of the plate.

In FIG. 12 a pair of heater plate members 500,502 above and below the termination region 32 may be sufficient; a current is shown induced in both plate members 500,502 generating heat from both the upper and lower plate members. Inwardly facing layers 504,506 of both plate members may be conductive nonmagnetic material such as copper, while clad outer layers 508,510 comprise magnetic material such as Alloy No. 42. Preferably a spring force F applied by members (not shown) of low thermal conductive material urges plate members 500,502 against sleeve assemblies 50. Coil 512 of apparatus 514 induces a corresponding high frequency alternating current in plate members 500,502 so that sufficient thermal energy is believed would be to reflow the solder of solder preforms 54 and shrink the heat recoverable tubing 52 appropriately.

Figure 13:
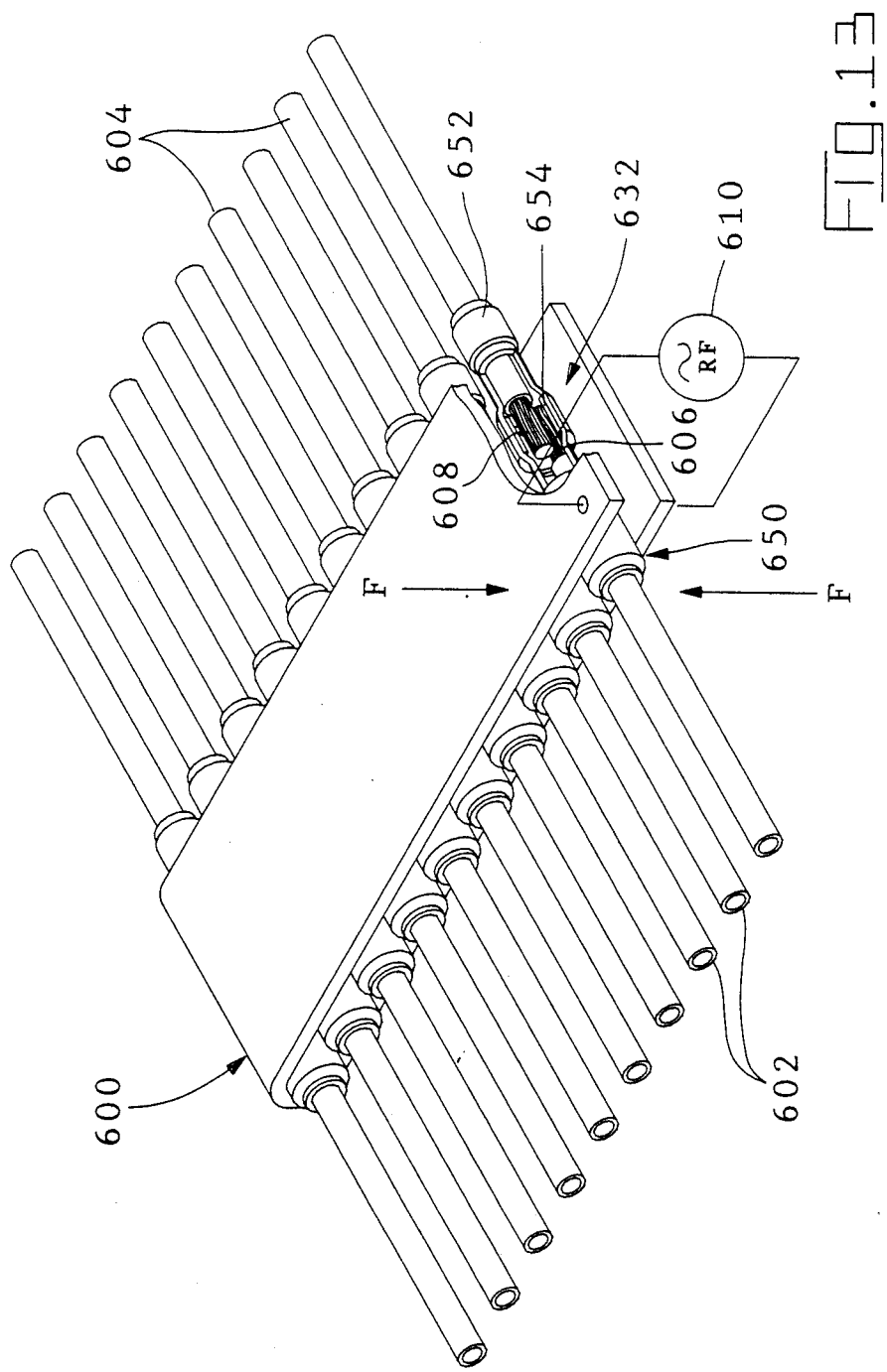
FIG. 13 is a longitudinal section view of an alternate embodiment showing splicing of ends of pairs of wires using the method of the present invention.

FIG. 13 illustrates that strap 600 is usable to form a plurality of sealed splice terminations, splicing associated first and second conductors 602,604 of an array together, by placing stripped wire ends 606,608 of pairs of conductors to be spliced within respective sleeve assemblies 650 comprised of solder preforms 654 within lengths 652 of heat recoverable tubing; surrounding the termination region 632 with a strap 600; and generating high frequency current in the strap by apparatus 610, producing thermal energy which penetrates the heat recoverable tubing lengths, melts the solder and shrinks the tubing, splicing the conductors and sealing the splice terminations thus formed.

In FIGS. 14 to 19 there is shown a variety of applications of the method of the present invention, where the thin heater strap is shapable. A shapable heater strap 700 has an inwardly facing layer 702 and outwardly facing layer 704 comprising magnetic material about 0.0004 to 0.0006 inches thick, and a central layer 706 comprising conductive nonmagnetic material about 0.0016 inches thick, so that strap 700 has a total thickness of about 0.0024 to 0.0028 inches thick; strap 700 is easily shaped while having the property of retaining the finally formed shape.

In FIG. 14 shapable heater strap 700 is used to splice an array 720 of pairs of first and second wire ends 722,724 of conductor wires, as in FIG. 13. Sleeve assemblies 726 are placed around each pair of wire ends 722,724 and each has a solder preform 728 within heat recoverable tubing 730, with sealant preforms (not shown) preferably placed at ends of the tubing 730 to seal to the conductor wire insulation. The array of sleeve assemblies 726 are placed atop a lower portion 708 of shapable heater strap 700 spaced slightly apart. An upper strap portion 710 extending from lower portion 708 is placed atop sleeve assemblies 726 adjacent outer surfaces of upper portions of heat recoverable tubing lengths 730. The sleeve assemblies 726 are then urged against each other and intermediate sections 712 of upper strap portion 710 are urged downwardly between the sleeve assemblies forming loops therebetween. The upper strap portion 710 is held against substantial surface portions of heat recoverable tubing lengths 730 for more efficient transmission of thermal energy, when strap 700 is energized by apparatus 750 such as through ohmic connections 752 engaging strap ends 714,716 insulated from each other by dielectric layer 718.

In FIG. 15 shapable heater strap 700 is wrapped around a termination region 800 similar to termination region 32 of FIG. 7. Solder tails 802 of respective terminals are being terminated to respective stripped wire ends 804; sleeve assemblies 806 are disposed therearound including solder preforms 808 within lengths of heat recoverable tubing 810. Shapable heater strap 700 has been wrapped around the array of sleeve assemblies 806, loosely at first, with lower strap portion 708 disposed against outer tubing surfaces defining a lower termination region portion and upper strap portion 710 disposed against outer tubing surfaces defining an upper termination region portion. A pair of elastomeric upper and lower members 812 are then pushed against outer surfaces of upper and lower heater strap portions 710,708 so that vertical ribs 814 located between sleeve assemblies 806 urge intermediate portions 712 into the area between adjacent sleeve assemblies 806, while bosses 816 urge upper and lower strap portions 710,708 directly against tubing lengths 810. This method increases the total surface area of strap 700 in engagement with outer surfaces of tubing lengths 810 for better heat conduction when strap 700 is energized by apparatus 750. Elastomeric members 812 may be made of silicone rubber for example and may be placed under slight spring force during the termination procedure to maintain surface engagement between the shapable heater strap and the sleeve assemblies.

Figure 16:
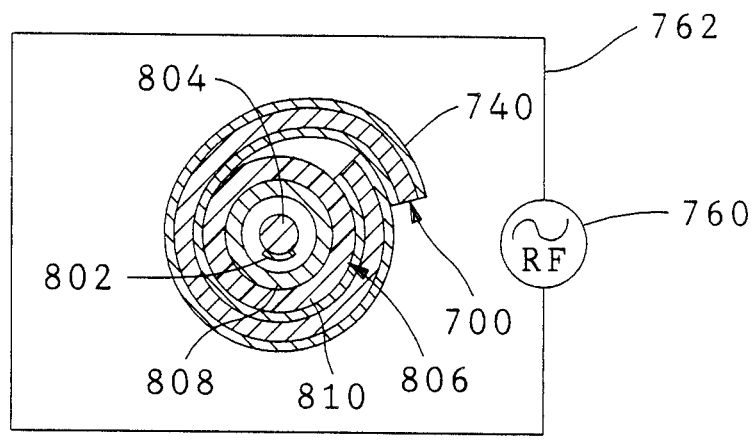
FIG. 16 illustrates a shapable heater strap for an individual termination of a terminal to a wire.

In FIG. 16 a short length 740 of shapable heater strap 700 is shown wrapped around a single sleeve assembly 806 of FIG. 15, and may be energized by apparatus 760 having a coil 762 extending therearound. Short length 740 after wrapping may be slightly crimped to maintain the crimped shape to maximize surface engagement between the strap and the outer surface of tubing length 810.

Figure 17:
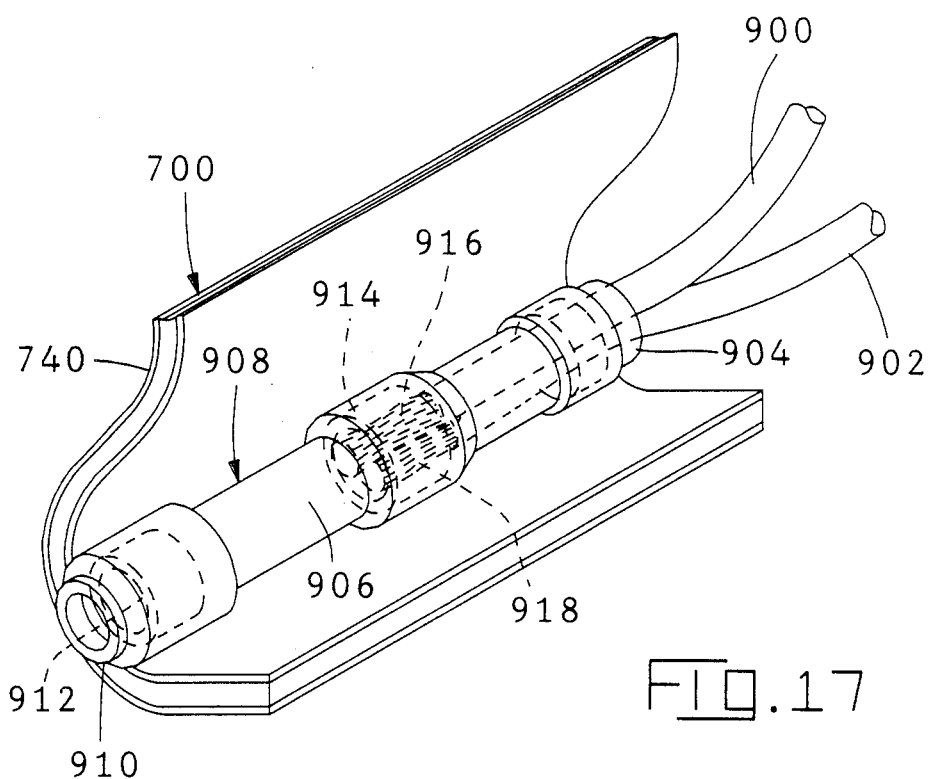
FIGS. 17 to 19 illustrate a shapable heater strap utilized for sealing an end of heat recoverable tubing, with a pair of spliced conductor wires extending from the other end in FIG. 17 and an unused terminal in FIG. 18, and FIG. 19 being a cross-section of an unfilled tubing end and a heater strap therearound.

In FIG. 17 a pair of conductor wires 900,902 coextend from a far end 904 of tubing length 906 of sleeve assembly 908. Near end 910 of sleeve assembly 908 contains a sealant preform 912 but is otherwise open. A solder preform 914 is disposed around the stripped wire ends 916,918 of wires 900,902. A short length 740 of shapable heater strap 700 is wrapped around sleeve assembly 908 including near end 910. When energized by high frequency alternating current, strap length 740 assures that near end 910 receives thermal energy which will melt sealant preform 912 and shrink the tubing therearound, which will close near end 910 and thus seal the splice termination even though no conductor wire or other conductive means extends through near end 910.

Figure 18:
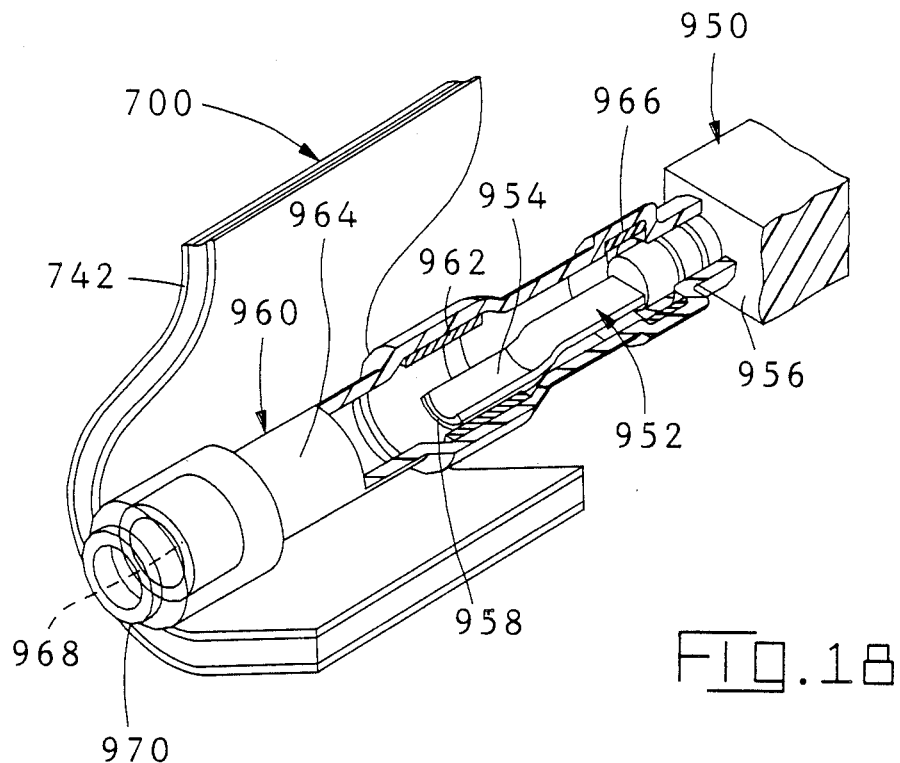
Figure 19:
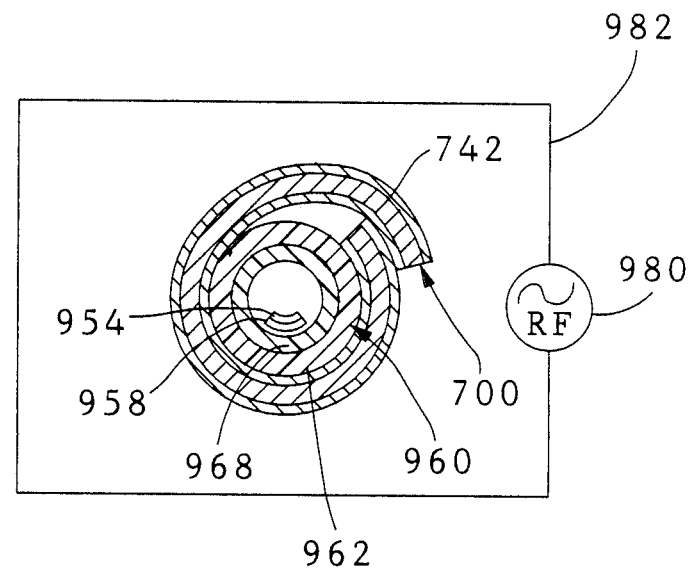

Such a method as described with reference to FIG. 17 may also be utilized as shown in FIG. 18 where terminals of a connector 950 have solder tails with integral layers of magnetic material clad or plated thereto which are disclosed in U.S. Pat. No. 4,852,252 assigned to the assignee hereof. One terminal 952 of such terminals remains unused and is not to be terminated to a corresponding conductor wire for some reason. Terminal 952 has a sleeve assembly 960 therearound having a solder preform 962 around solder tail 954 thereof, and a length of heat recoverable tubing 964 with sealant preforms 966,968 at both ends, sealant preform 966 being adjacent connector housing 956. Solder tail 954 has an outwardly facing layer 958 of magnetic material which will still generate thermal energy to reflow the solder of the solder preform 962 when energized with an induced high frequency alternating current, and will shrink the portion of the heat recoverable tubing around solder tail 954. Terminal 952 will transmit thermal energy therealong to melt sealant preform 966 at connector housing 956 and shrink tubing 964 therearound to seal to housing 958. However there is no conductor wire extending from the solder tail away from the connector 950 and thus is not available to transmit heat therealong from the solder area to the end of the tubing length. When a short length of shapable heater strap 742 is wrapped around end 970 of the tubing length 964 and the entire terminal/sleeve assembly is energized by a coil therearound, the additional heater strap 742 is energized and melts and tackifies the sealant preform 968 in the otherwise empty end 970 of the tubing length 964 and forms a solid mass, and the tubing shrinks therearound, in order to provide an assured method of insulating the otherwise exposed terminal portion. FIG. 19 illustrates a cross-section of tubing end 970 of sleeve assembly 960 having sealant preform 968 therewithin, surrounded by heater strap 742 prior to being energized by coil 982 of apparatus 980; the end of solder tail 954 is visible and includes outwardly facing layer 958 of magnetic material.

The construction of heater means may vary as is shown in FIGS. 5 and 9 through 19 both in general physical shape and in the laminar structure and be useful in carrying out the method of the present invention. Other variations may be made by skilled artisans to the present invention which are within the spirit of the invention and the scope of the claims.

What is claimed is:

1. A method of joining at least one associated pair of first and second conductor means and simultaneously sealing the joint thus formed, comprising the steps of:
   providing a source for generating a constant amplitude high frequency alternating current of known frequency;
   selecting at least a first conductor means and at least a second conductor means, each said first and second conductor means including respective first and second contact sections extending from respective first and second insulated portions and exposed to be joined in a termination region;
   forming a heater means including at least one portion having a length sufficient to extend transversely across said termination region and adjacent said first and second contact sections, said heater means including a first layer of a first metal having low electrical resistance and minimal magnetic permeability and deposited on a major surface thereof a second layer of a second metal having high electrical resistance and high magnetic permeability, said second layer having a thickness approximately equal to one skin depth of said second metal, given said known frequency;
   selecting solder material having a nominal melting temperature slightly less than the Curie temperature of said second metal and selecting heat recoverable tubing having a nominal shrinking temperature slightly less than the Curie temperature of said second metal;
   positioning each said first and associated second contact section together in paired, adjacent and coextending relationship, placing a preform of said solder material containing flux therefor at least adjacent each said pair of first and second contact sections, and placing a length of said heat recoverable tubing of sufficient diameter around each said solder preform and said pair of first and second contact sections and extending axially therefrom along at least a portion of said first and second insulated conductor portions to first and second tubing ends, defining a pretermination assembly;
   disposing said at least a first portion of said heater means across said termination region of said pretermination assembly and at least adjacent outer surfaces of each said length of tubing; and
   generating said constant amplitude high frequency alternating current in said heater means for a selected length of time,
   whereby a current is generated in said heater means generating thermal energy sufficient to achieve and maintain the Curie temperature of said second layer, the thermal energy being transmitted radially inwardly through said heat recoverable tubing lengths to said solder preforms adjacent said first and second contact sections melting said solder preforms and forming assured joints between said first and second contact sections, and the thermal energy shrinking said tubing lengths to conform to the outwardly facing surfaces of said joined first and second contact sections and tightly engaging the first and second insulated conductor portions extending therefrom, sealing the joints after which the heater means is removable.

2. A method as set forth in claim 1 wherein said current is transmitted to said heater means by ohmic connections to metal portions thereof insulated from each other.

3. A method as set forth in claim 2 wherein said heater means comprises a plate member having two conductive nonmagnetic metal layers at least one thereof having a layer of magnetic material deposited thereon, said conductive nonmagnetic metal layers being insulated from each other by a dielectric layer, and said ohmic connections are made to said two metal layers at an end of said plate member.

4. A method as set forth in claim 2 wherein said heater means comprises a strap wrapped around said termination region with ends thereof spaced apart, and said ohmic connections are made to said ends.

5. A method as set forth in claim 2 wherein said heater means comprises a strap wrapped around said termination region, said strap has continuously therealong two conductive nonmagnetic metal outer layers and two magnetic material inner layers deposited thereon and insulated from each other by a dielectric layer, and said ohmic connections are made to said two outer layers at an end of said strap.

6. A method as set forth in claim 2 wherein said heater means comprises a strap wrapped around said termination region with ends thereof spaced apart, said strap has continuously therealong an inner layer of conductive nonmagnetic metal on at least one major surface of which is deposited an outer layer of magnetic material, and said ohmic connections are made to said ends.

7. A method as set forth in claim 6 wherein both major surfaces of said inner layer have an outer layer of magnetic material deposited thereon.

8. A method as set forth in claim 1 wherein said apparatus includes a coil within which said pretermination assembly is capable of being placed with said coil at least radially surrounding said heater means.

9. A method as set forth in claim 8 wherein said heater means comprises a strap wrapped around said termination region.

10. A method as set forth in claim 8 wherein said heater means comprises a pair of plate members extending respectively transversely above and below said termination region and adjacent to said tubing lengths.

11. A method as set forth in claim 1 wherein said said second layer has a thickness of between about 1.5 and 2 times its skin depth.

12. A method as set forth in claim 1 wherein each said solder preform has a sleeve shape and is previously secured within a central portion of a respective said heat recoverable tubing length.

13. A method as set forth in claim 1 wherein said heater means is a thin shapable strap member.

14. A method as set forth in claim 13 wherein a respective said heater means is wrapped circumferentially around each said length of heat recoverable tubing containing a said solder preform at least adjacent each said pair of said first and second contact sections.

15. A method as set forth in claim 13 wherein said pretermiantion assembly comprises a planar array of a plurality of said pairs of first and second conductive means within respective lengths of heat recoverable tubing, said planar array having an upper region comprised of upper portions of said tubing lengths and a lower region comprised of lower portions of said tubing lengths, and said heater means is placed along at least one of said upper and lower regions and shaped to engage substantial portions of outer surfaces of the tubing length portions of said at least one of said upper and lower regions respectively.

16. A method as set forth in claim 1 wherein said first and second conductive means are conductor wires and said first and second contact sections are stripped wire ends thereof.

17. A method as set forth in claim 1 wherein said first conductive means is a conductor wire and said first contact section is a stripped wire end thereof, and said second conductive means is a terminal and said second contact section is adapted to receive said stripped wire end.

18. The method of claim 1 wherein said at least a first portion of said heater means is held firmly against said outer surfaces of each said length of tubing adjacent thereto.

19. A method for terminating wires to terminals and simultaneously sealing the terminations, comprising the steps of:
providing a source for generating a constant amplitude high frequency alternating current of known frequency;
selecting a means housing a plurality of terminals in a planar array, each said terminal including a portion extending rearwardly from said housing means to a wire-receiving section at a wire-receiving end, said wire-receiving sections together defining a planar termination region;
forming a heater means including at least one planar portion having a length sufficient to extend transversely across said planar termination region and adjacent said wire-receiving sections, said heater means including a first layer of a first metal having low electrical resistance and minimal magnetic permeability and deposited on at least one major surface thereof a second layer of a second metal having high electrical resistance and high magnetic permeability, said second layer having a thickness approximately equal to one skin depth of said second metal, given said known frequency;
selecting solder material having a nominal melting temperature slightly less than the Curie temperature of said second metal and selecting heat recoverable tubing having a nominal shrinking temperature slightly less than the Curie temperature of said second metal;
positioning a stripped wire end of a conductor wire associated with each said terminal along said wire-receiving section of each said terminal;
placing a preform of said solder material containing flux therefor at least adjacent each said stripped wire end along a respective said wire-receiving section and placing a length of said heat recoverable tubing of sufficient diameter around each said solder preform and said respective wire-receiving section and extending forwardly along at least a portion of said associated terminal to a forward tubing end and rearwardly along said stripped wire end to an insulated portion of said wire to a rearward tubing end, defining a pretermination assembly;
disposing said at least one planar portion of said heater means across said planar termination region of said pretermination assembly and at least adjacent outer surfaces of each said length of tubing; and
generating said constant amplitude high frequency alternating current in said heater means for a selected length of time,
whereby a current is generated in said heater means generating thermal energy sufficient to achieve and maintain the Curie temperature of said second layer, the thermal energy being transmitted radially inwardly through said heat recoverable tubing lengths to said solder preforms adjacent said stripped wire ends and said wire-receiving sections melting said solder preforms and forming assured terminations of said stripped wire ends to said wire-receiving sections, and the thermal energy shrinking said tubing lengths to conform to the outwardly facing surfaces of said wires and said terminal portions therewithin and tightly engaging the insulated wires extending rearwardly therefrom and the terminal portions extending forwardly therefrom, sealing the terminations, after which the heater means is removable.

20. A method as set forth in claim 19 wherein each said length of heat recoverable tubing includes respective sealant preforms within said forward and rearward ends thereof comprising heat recoverable sleeves adapted to shrink and tackify at a temperature at lest slightly less than said Curie temperature of said second metal, said sealant preforms located to surround respective said terminal portions forwardly of said wire-receiving sections and respective insulated portions of said wires, thereby bonding and assuredly sealing against said terminal portions and insulated wire portions therewithin and said tubing forward and rearward ends upon shrinking and tackifying caused by said thermal energy.

21. A method as set forth in claim 20 wherein each said solder preform has a sleeve shape and is previously secured within a central portion of a respective said heat recoverable tubing length.

22. A method as set forth in claim 21 wherein said housing means includes a flange portion extending rearwardly around an intermediate portion of each said terminal, and a forward end of each said heat recoverable tubing length is placed over said wire-receiving section of a respective said terminal and secured sealingly around and to a respective said flange portion, defining a subassembly of said housing means and said plurality of said heat recoverable tubing lengths prior to wire insertion and termination.

23. The method of claim 19 wherein said at least one planar portion of said heater means is held firmly against said outer surfaces of each said length of tubing adjacent thereto.

24. A method of simultaneously splicing an array of pairs of wire ends and sealing the splice terminations, comprising the steps of:
  providing a source for generating a constant amplitude high frequency alternating current of known frequency;
  selecting an array of stripped wire ends of first conductors and an axially opposed array of stripped wire ends of second conductors to be spliced to said first conductors, together defining a planar termination region;
  forming a strap having a length sufficient to surround said planar termination region when wrapped transversely therearound adjacent said wire ends with means securing said strap in said surrounding relationship, said strap comprising a first layer of a first metal having low electrical resistance and minimal magnetic permeability and deposited on a major surface thereof a second layer of a second metal having high electrical resistance and high magnetic permeability, said second layer having a thickness approximately equal to one skin depth of said second metal, given said known frequency;
  selecting solder material having a nominal melting temperature slightly less than the Curie temperature of said second metal and selecting heat recoverable tubing having a nominal shrinking temperature slightly less than the Curie temperature of said second metal;
  positioning associated said stripped wire ends of said first and second conductor wires coextending together in pairs, and placing a preform of said solder material containing flux therefor at least adjacent each said pair of stripped wire ends and placing a length of said heat recoverable tubing of sufficient diameter around each said solder preform and said respective wire end pair and along said stripped wire ends to insulated portions of said conductor wires to tubing ends, defining a pretermination assembly;
  placing and securing said strap around said pretermination assembly; and
  generating said constant amplitude high frequency alternating current in said strap for a selected length of time,
  whereby the current generated in said strap generates sufficient thermal energy to achieve and maintain the Curie temperature of said second layer, the thermal energy being transmitted radially inwardly through said heat recoverable tubing lengths to said solder preforms adjacent said stripped wire ends melting said solder preforms and forming assured terminations of said stripped wire ends together, and the thermal energy shrinking said tubing lengths to conform to the outwardly facing surfaces of said wire ends and tightly engaging the insulated portions of said conductor wires extending outwardly therefrom, sealing the splice terminations, after which the heater means is removable.

25. A method of sealing an end of a length of heat recoverable tubing comprising the steps of:
  providing a source for generating a constant amplitude high frequency alternating current of known frequency;
  forming a strap having a selected length and comprising a first layer of a first metal having low electrical resistance and minimal magnetic permeability and deposited on a major surface thereof a second layer of a second metal having high electrical resistance and high magnetic permeability, said second layer having a thickness approximately equal to one skin depth of said second metal, given said known frequency;
  selecting a length of heat recoverable tubing of a material having a nominal shrinking temperature slightly less than the Curie temperature of said second metal;
  placing in at least one end to said length of tubing a sealant preform comprised of material adapted to melt and tackify at a temperature slightly less than said Curie temperature of said second metal;
  placing and securing said strap circumferentially around said at least one end of said length of tubing; and
  generating said constant amplitude high frequency alternating current in said strap for a selected length of time,
  whereby the current generated in said strap generates sufficient thermal energy to achieve and maintain the Curie temperature of said second layer, the thermal energy being transmitted radially inwardly through said heat recoverable tubing to said sealant preform, and the thermal energy melting and tackifying said sealant preform and radially shrinking said at least one end of said length of tubing around said sealant preform, said melted and tackified sealant preform forming a seal joint and bonding to said shrunken tubing therearound sealing the tubing end, after which the heater means is removable.

26. A method as set forth in claim 25 wherein a conductor means needing to be insulated is placed within an other end of said tubing length.

* * * * *